United States Patent
Cao et al.

(10) Patent No.: US 10,067,970 B1
(45) Date of Patent: *Sep. 4, 2018

(54) DISASTER RECOVERY FOR SPLIT STORAGE CLUSTER

(71) Applicant: International Business Machines Corporation, Armonk, NY (US)

(72) Inventors: Miao Ke Cao, Shanghai (CN); Wei Yin, Shanghai (CN); Ning Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,252

(22) Filed: Nov. 30, 2017

Related U.S. Application Data

(63) Continuation of application No. 15/458,080, filed on Mar. 14, 2017.

(51) Int. Cl.
  *G06F 7/04* (2006.01)
  *G06F 17/30* (2006.01)
  *G06F 11/16* (2006.01)
  *G06F 11/14* (2006.01)

(52) U.S. Cl.
  CPC .... *G06F 17/30362* (2013.01); *G06F 11/1469* (2013.01); *G06F 11/1612* (2013.01); *G06F 17/30581* (2013.01)

(58) Field of Classification Search
  None
  See application file for complete search history.

(56) References Cited

U.S. PATENT DOCUMENTS

| | | | |
|---|---|---|---|
| 7,496,782 B1 | 2/2009 | Kownacki | |
| 8,498,967 B1 | 7/2013 | Chatterjee et al. | |
| 8,595,546 B2 | 11/2013 | Dalton | |
| 8,706,798 B1 * | 4/2014 | Suchter | G06F 9/5038 709/202 |
| 8,904,231 B2 | 12/2014 | Coatney et al. | |

(Continued)

OTHER PUBLICATIONS

IBM Knowledge Center, "HyperSwap system configuration details", Version 7.7.1, printed on Dec. 27, 2016, 3 pages.

(Continued)

*Primary Examiner* — Hung Le
(74) *Attorney, Agent, or Firm* — Edward J. Wixted, III

(57) ABSTRACT

A method, computer program product and/or computer system assigns access to a quorum disk in a split-storage cluster environment when a communication link between storage systems fails. Access to the quorum disk is based on storage system I/O performance. Priority is given to the storage system that has a higher performance before the link failure. When the communication link fails, both storage systems attempt to access the quorum disk. If the system that first attempts to access the quorum disk is the non-priority storage system, a timer is started. If the priority system attempts to access the quorum disk within a predetermined time interval, the priority system locks the quorum disk and forms the cluster. If the priority system does not attempt to access the quorum disk within the predetermined time interval, the non-priority system locks the quorum disk and forms the cluster.

1 Claim, 4 Drawing Sheets

(56) References Cited

U.S. PATENT DOCUMENTS

| | | | |
|---|---|---|---|
| 2008/0301256 A1* | 12/2008 | McWilliams | G06F 12/0284 709/214 |
| 2012/0078432 A1* | 3/2012 | Weatherhead | G06Q 10/06 700/295 |
| 2013/0054913 A1* | 2/2013 | Maeda | G06F 9/50 711/162 |
| 2013/0268495 A1 | 10/2013 | Thiel et al. | |
| 2016/0085647 A1 | 3/2016 | Ramasubramaniam et al. | |
| 2017/0052707 A1 | 2/2017 | Koppolu et al. | |
| 2017/0149690 A1* | 5/2017 | Le Rudulier | H04L 47/821 |
| 2017/0302502 A1 | 10/2017 | Feng | |

OTHER PUBLICATIONS

Cao et al., "Disaster Recovery for Split Storage Cluster", U.S. Appl. No. 15/458,080, filed Mar. 14, 2017, 25 pages.

IBM Appendix P, list of patents and patent applications treated as related, filed herewith, 2 pages.

* cited by examiner

DISASTER RECOVERY FOR SPLIT STORAGE CLUSTER

BACKGROUND OF THE INVENTION

The present invention relates generally to the field of computer storage systems, and more specifically to managing a clustered computer storage system when a communication channel between clusters is broken.

In some storage architectures, a swap function provides high storage volume availability through two sites that may be separated physically and even geographically. A fully-independent copy (a mirror) of the data is maintained at each site. When data is written at either storage site, both copies are synchronously updated, through background communications, before the write operation is completed.

SUMMARY

According to an aspect of the present invention, there is a method, computer program product and/or system for accessing a quorum disk in a split-storage cluster environment that performs the following operations (not necessarily in the following order): (i) recording, over a time interval, a first storage system input/output (I/O) usage, and a second storage system I/O usage; (ii) determining that a communication link between the first storage system and the second storage system is not operative; (iii) determining that the first storage system I/O usage, over the time interval, was greater than the second storage system I/O usage; (iv) assigning a priority to the first storage system; (v) on condition that the first storage system attempts to access the quorum disk before the second storage system, accessing and locking the quorum disk by the first storage system; (vi) on condition that the second storage system attempts to access the quorum disk before the first storage system accesses the quorum disk: starting a timer; (vii) on condition that the first storage system accesses the quorum disk before the timer reaches a predetermined threshold, locking the quorum disk by the first storage system; and (viii) on condition that the first storage system does not access the quorum disk before the timer reaches the predetermined threshold, granting access to the quorum disk to the second storage system and locking the quorum disk by the second storage system. Accessing and locking the quorum disk means gaining exclusive access to the quorum disk, reading cluster information from the quorum disk, and forming a cluster in accordance with the cluster information stored on the quorum disk. The term "not operative" means the communication link is operating at a performance level that is less than a minimum threshold performance level. The term "performance level" indicates at least one of the following: (a) a rate of data transfer, where a greater rate of data transfer is a higher performance level; (b) a latency, where a shorter latency is a higher performance level; and (c) a rejection rate, where a lower rate of rejected service requests is a higher performance level.

DETAILED DESCRIPTION

The present invention will now be described in detail with reference to the Figures.

Some embodiments of the present invention use a system of controlled access to a quorum disk to determine which node in a cluster will maintain the cluster should a communication link between storage systems in the cluster goes down. The system gives a higher priority to the storage system that had been processing a higher I/O rate during a recent time interval prior to the communication failure. If the higher-performing storage system does not acquire and lock access to the quorum disk in a threshold amount of time, the other (lower-performing) system is allowed to acquire and lock access to the quorum disk. The system that acquires and locks access to the quorum disk forms the cluster and assumes the role of managing the host input/output (I/O) within the cluster, at least until the communication failure is rectified.

Figure 1:
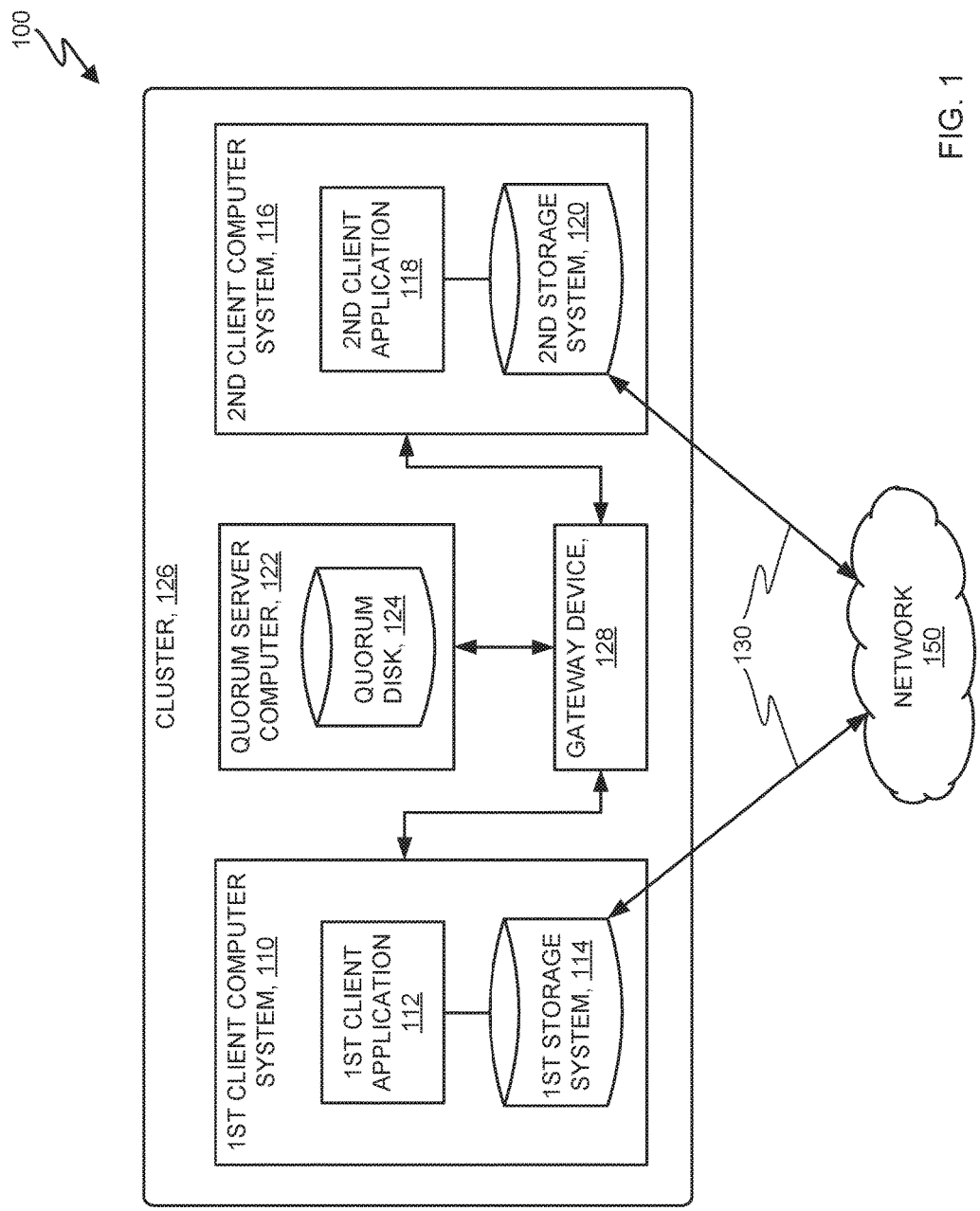
FIG. 1 is a functional block diagram depicting a computing environment in accordance with at least one embodiment of the present invention.

FIG. 1 is a functional block diagram depicting a computing environment in accordance with an embodiment of the present invention. Computing environment 100 includes: $1^{st}$ client computer system 110; $1^{st}$ client application 112; $1^{st}$ storage system 114; $2^{nd}$ client computer system 116; $2^{nd}$ client application 118; $2^{nd}$ storage system 120; background storage communication link 130; and network 150. $1^{st}$ and $2^{nd}$ client computer systems (110 and 116) can be any of a desktop computer, a laptop computer, a specialized computer server, or any other computer system known in the art. In some embodiments, client computer system 110 and 116 each represents a computer system utilizing clustered computers and components to act as a single pool of seamless resources when accessed through network 150. In general, client computer systems 110 and 116 are representative of any electronic device, or combination of electronic devices, capable of executing machine-readable program instructions, as described in greater detail with regard to FIG. 3.

In a two-site high availability clustered computing system, a fully-independent copy of the data is maintained in a storage system at each site. When data is written by a host at either site, both copies are synchronously updated before the write operation is completed. To maintain these redundant copies of the data for both systems, the storage systems communicate in the background, via network communications.

$1^{st}$ and $2^{nd}$ storage systems, respectively 114 and 120, are in the same cluster (126) but different sites (respectively $1^{st}$ and $2^{nd}$ client computer systems 110 and 116). The $1^{st}$ and $2^{nd}$ storage systems have network connections and in normal operations, they share quorum disk 124. $1^{st}$ client application 112 performs I/O with $1^{st}$ storage system 114. $2^{nd}$ client application 118 performs I/O with $2^{nd}$ storage system 120.

For example, assume $1^{st}$ client application 112, of $1^{st}$ client computer system 110, of cluster 126, stores a spreadsheet on $1^{st}$ storage system 114. $1^{st}$ storage system sends a copy of the spreadsheet to $2^{nd}$ storage system 120 on $2^{nd}$ client computer system 116. The $2^{nd}$ storage system stores the spreadsheet which becomes a redundant copy.

In like manner, if $2^{nd}$ client application stores, for example, an update to a database table, on $2^{nd}$ storage system 120, the $2^{nd}$ storage system sends a copy of the update to $1^{st}$ storage system 114 where a redundant copy of the database table is updated.

The two storage systems (114 and 120), in effect, each serve as a backup for the other. If one storage system goes down, the other provides uninterrupted storage services for both systems.

If background storage communication link 130 should fail, I/O traffic from one client computer system to its respective storage system (for example $1^{st}$ client computer system 110 and $1^{st}$ storage system 114) continues as normal. However the background communications between the $1^{st}$ storage system and the $2^{nd}$ storage system may be interrupted, and may have to be rerouted to maintain the storage redundancy.

Storage cluster 126 stores certain cluster information in quorum disk 124, of quorum server 122. The quorum disk is updated whenever there is a cluster state change or a configuration change. In the event of a failure that prevents communications between the $1^{st}$ and $2^{nd}$ storage systems, $1^{st}$ client computer system 110 and $2^{nd}$ client computer system 116 both attempt to acquire access to the quorum disk and lock out the other system, by locking the quorum disk. The first system to lock the quorum disk reads the cluster information and assumes the role of managing the host input/output (I/O) within the cluster. Locking the quorum disk means gaining exclusive access to it. Once locked, no other system can access or read the quorum disk.

The two storage systems may have unbalanced I/O. For example, $1^{st}$ storage system 114 may interact with $1^{st}$ client computer system 110 with greater I/O activity than $2^{nd}$ storage system 120 interacts with $2^{nd}$ client computer system 116. However, if the $2^{nd}$ storage system were to access and lock quorum disk, system I/O performance within the cluster may not be optimal. Some embodiments of the present invention give higher priority to the system which has a history of higher I/O performance. If the higher-priority system does not access and lock the quorum disk within a threshold length of time, then the other system (having a lower I/O performance history, but was first to attempt to access the quorum disk) will be allowed to access and lock the quorum disk.

By way of illustrative example, if storage communication link 130 goes down, both $1^{st}$ and $2^{nd}$ storage systems attempt to access the quorum disk. The node that first reads the cluster information initially is the "winner". The "winning" system reads the previous cluster information from quorum disk 124, to recover and maintain cluster 126. Locking the quorum disk prohibits other nodes from reading the cluster data, thereby ensuring that only one site at a time maintains the cluster, and only one cluster is restored.

In some embodiments of the present invention, a communication link may be considered to be down if any minimum threshold performance level may not be met, such as: (i) all communications via the link fail; (ii) throughput (measured for example, in MB per second) drops below a minimum threshold performance level; (iii) rejection rate for data transmissions exceeds a maximum threshold performance level; and/or (iv) latency exceeds a maximum threshold.

Now suppose that before the failure (of communication link 130), 1st storage system 114 had averaged 100 GB of data transfer with first client computer system 110 over a recent time interval, while $2^{nd}$ storage system 120 averaged 1 GB of data transfer with second client computer system 116. If the $2^{nd}$ storage system were to assume the role of managing the cluster storage, its lower I/O performance (lower than the $1^{st}$ storage system I/O performance) may lead to a degradation with respect to overall I/O performance for the whole cluster.

When a communication link between two sites is broken, some embodiments of the present invention may recognize one, or more, of the following facts, potential problems and/or potential areas for improvement with respect to the current state of the art: (i) the host cannot identify (that is, cannot predict) which site will assume the role of managing the host I/O in case of a communications failure; (ii) if the site which accesses and locks the quorum disk and forms the cluster (the "winning site") actually handles less I/O, the I/O performance of the cluster as a whole may be negatively impacted (perhaps for example, due to a long distance between the systems, or physical I/O limitations in the storage system itself.

In some embodiments of the present invention, an inline virtualization (or "gateway") device, or a virtualizing redundant array if independent disks (RAID) computer data storage system monitors host input/output (I/O) activity of each site over a most recent time interval (for example, a continuously rolling 10 minute window), and calculates the proportion of all I/O activity that comes from each site.

If a link between two sites goes down, each site tries to access and lock the quorum disk. A higher priority for doing so is granted to the site that has had more I/O activity in the most recent time interval leading up to the moment when the link went down (for example during the most recent 10 minutes). If the "winning site" fails to access the quorum disk within a threshold amount of time, the other site is allowed to access the quorum disk and form a cluster.

Some embodiments of the present invention may include one, or more, of the following features, characteristics and/or advantages: (i) host I/O performance is optimized when a communication link between two sites goes down; and (ii) a host or administrator can predict which site will form cluster in a link break-down scenario, enabling the administrator to configure the cluster, in advance of a communication break-down, to better manage the system during such a breakdown.

Figure 2A:
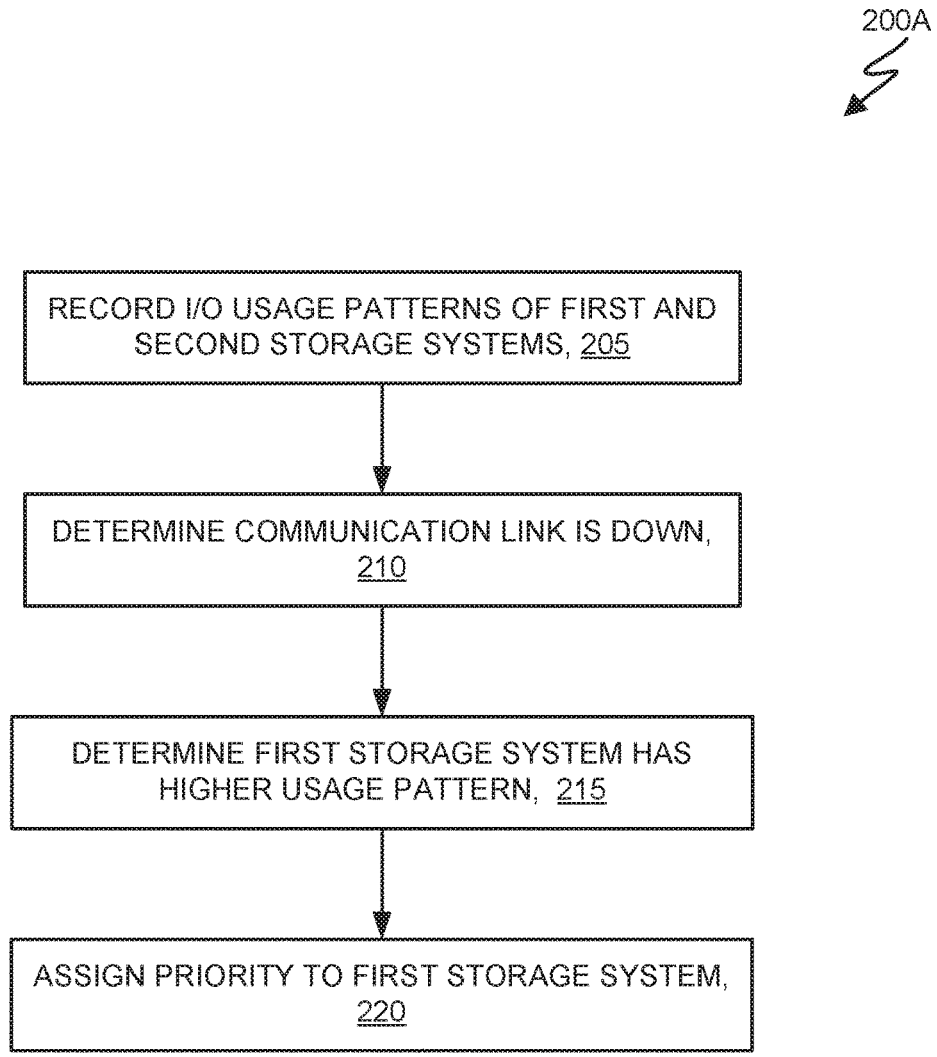
FIG. 2A is a prioritizing flowchart depicting a prioritizing method in accordance with at least one embodiment of the present invention.

FIG. 2A shows prioritizing flowchart 200A depicting a method of prioritizing storage system, according to the present invention. Processing begins at operation 205, where an inline virtualization (or "gateway") device, or a virtualizing RAID computer data storage system (not separately shown in the Figures) monitors host input/output (I/O) activity of each site over a most recent time interval.

Processing proceeds to operation 210 where a communications monitoring system (not separately shown in the Figures) determines that background communication link 130 is down, interrupting communications between storage systems 114 and 120 (see FIG. 1). Communications link 130 is used, among other things, for mutual mirroring of data stored on $1^{st}$ and $2^{nd}$ storage systems (respectively 114 and 120, see FIG. 1).

Processing proceeds to operation 215, where gateway device 128, of cluster 126 (see FIG. 1), determines that the $1^{st}$ storage system has a higher I/O activity than the $2^{nd}$ storage system. I/O activity may include one or more of: (i) total rate of data transfer; (ii) duty cycle (active time vs. idle time); and/or (iii) total bytes transferred over a given time interval.

Processing proceeds to operation 220 where quorum server computer 122 (see FIG. 1) assigns a higher priority to the $1^{st}$ storage system, with respect to accessing and locking the quorum disk. The higher priority is given to the $1^{st}$ storage system because of the higher I/O activity determined in operation 215 above.

Figure 2B:
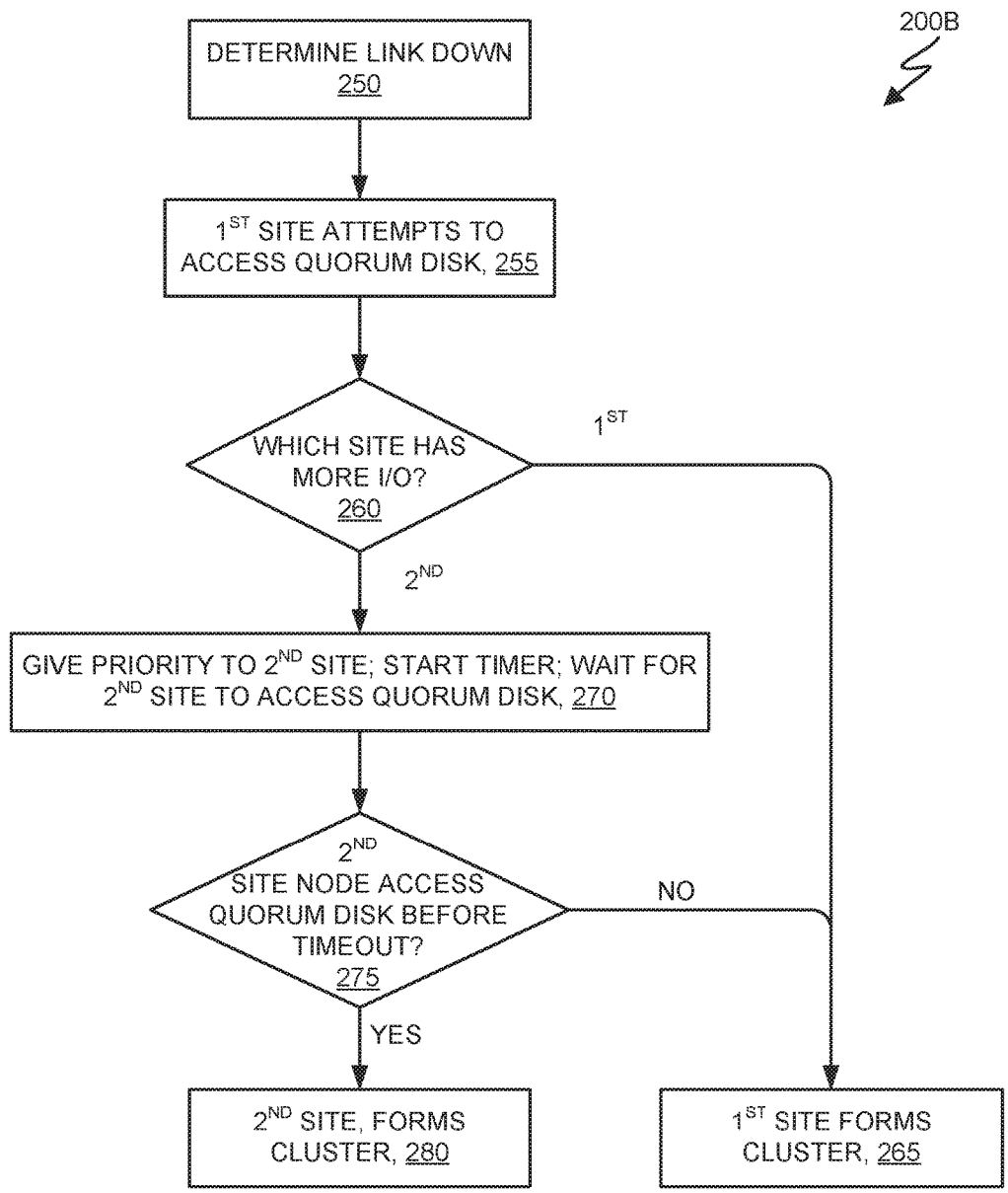
FIG. 2B is an access assignment flowchart depicting a quorum disk assignment method in accordance with at least one embodiment of the present invention.

FIG. 2B shows access assignment flowchart 200B depicting a method of assigning access to a quorum disk, according to the present invention. Processing begins at operation 250, where a communications monitoring system (not separately shown in the Figures) determines that background communication link 130 is down, interrupting communications between storage systems 114 and 120 (see FIG. 1). Communications link 130 is used, among other things, for mutual mirroring of data stored on $1^{st}$ and $2^{nd}$ storage systems (respectively 114 and 120, see FIG. 1).

Processing proceeds to operation 255, where the $1^{st}$ storage system makes an attempt to access the quorum disk before the $2^{nd}$ storage system does (see FIG. 1). However, it has yet to be determined whether the $1^{st}$ storage system is the optimal storage system to be given the role of managing the host input/output (I/O) within the cluster.

Processing proceeds to decision 260, where gateway device 128 determines which site ($1^{st}$ or $2^{nd}$ storage system), had been handling more I/O during the most recent time interval before the communication link went down. If the $1^{st}$ storage system had been processing more I/O (decision 260, "$1^{st}$" branch), processing continues at operation 265 where the $1^{st}$ storage system is given access to, and locks, the quorum disk, and proceeds forward as manager of cluster 126.

If $2^{nd}$ storage system 120 had been processing more I/O (decision 260, "$2^{nd}$" branch), processing proceeds to operation 270, where the $2^{nd}$ storage system is given a higher priority than $1^{st}$ storage system 114, and a timer is started, during which quorum server computer 122 waits for the $2^{nd}$ storage system to attempt to access cluster 126 information on quorum disk 124.

Processing proceeds to decision 275, where if $2^{nd}$ storage system attempts to access cluster 126 information on quorum disk 124 before timeout of the timer started in operation 270 (decision 275, "Yes" branch), processing proceeds to operation 280 where the $2^{nd}$ storage system is granted access to the quorum disk, locks the quorum disk, and proceeds forward as manager of cluster 126. If $2^{nd}$ storage system fails to attempt to access cluster 126 information on quorum disk 124 before timeout of the timer (decision 275, "No" branch), $1^{st}$ storage system 114 is granted access to the quorum disk, locks the quorum disk, and proceeds forward as manager of cluster 126.

Some embodiments may not have these potential advantages and these potential advantages are not necessarily required of all embodiments.

In some embodiments of the present invention perform the following actions: (i) an inline virtualization (or "gateway") device, (for example gateway device 128 of cluster 126 of FIG. 1), or a virtualizing RAID computer data storage system monitors host input/output (I/O) activity of $1^{st}$ storage system 114 and $2^{nd}$ storage system 120, over a most recent time interval (for example, a continuously rolling 10 minute window), and calculates the proportion of all I/O activity that comes from each site; (ii) when communications link 130 between $1^{st}$ and $2^{nd}$ storage systems in storage cluster level (storage cluster 126), each side ($1^{st}$ and $2^{nd}$ storage systems) will try to access the quorum disk to form (or re-form) cluster 126 and to serve host I/O from both client computer systems (110 and 116); (iii) quorum server computer 122 grants higher priority (to access and lock the quorum disk to form (or re-form) cluster 126) to the system ($1^{st}$ or $2^{nd}$ storage system) that previously had the greater volume of I/O activity; (iv) the quorum server computer further starts a timer; and (v) if the site with the greater volume of I/O does not access the quorum disk within the time window defined by the timer, the other system is granted access to, and locks, the quorum disk and forms (or re-forms) cluster 126 to prevent the whole cluster level system (126) from going down.

Some embodiments of the present invention may include one, or more, of the following features, characteristics and/or advantages in a situation where a communication link between two sites in a cluster level goes down: (i) overall host I/O performance is optimized; and (ii) a host system and/or system administrator can predict which site will form a cluster.

In some embodiments of the present invention, a quorum-disk system as hereinbefore described, exists in normal operation and is kept up to date. Referring to FIG. 1, first storage system 114 and second storage system 120 are in one cluster (cluster 126). Because the $1^{st}$ and $2^{nd}$ storage systems are controlled by the same cluster, they share quorum disk 124. If communication link 130 fails, both site nodes ($1^{st}$ and $2^{nd}$ client computer systems, respectively 110 and 116) will try to access and lock the quorum disk. Once one site successfully accesses and locks the quorum disk, that "winning" site recovers the cluster and the other site's node is no longer operative, at least until the communication failure is rectified. In normal operation, data in $1^{st}$ storage system 114 is mirrored in $2^{nd}$ storage system 120 and vice versa. However, once one site is inoperative, mirroring is no longer performed, at least until and unless the communication failure is rectified.

Figure 3:
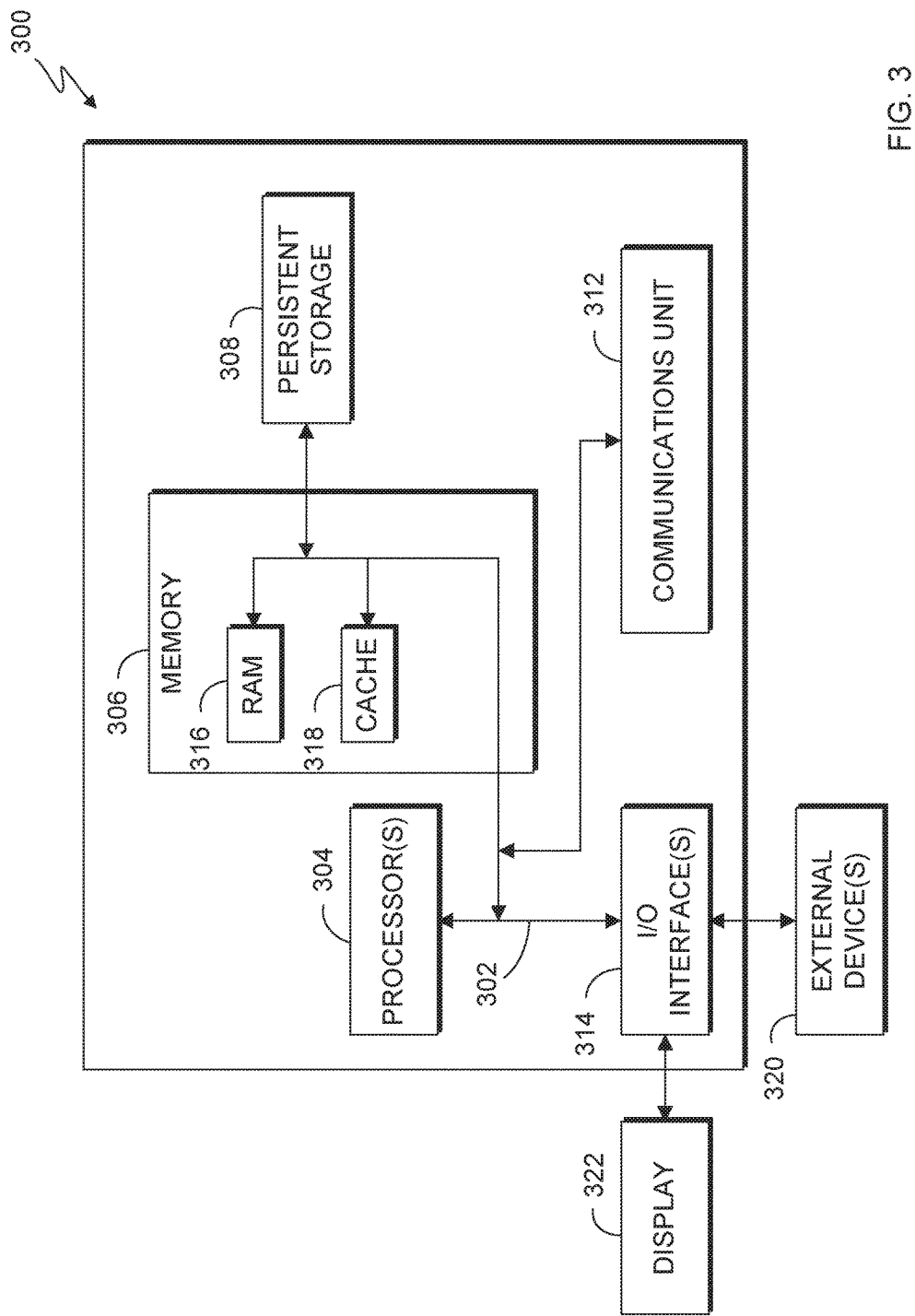
FIG. 3 is a block diagram depicting components of a computer, in accordance with at least one embodiment of the present invention.

FIG. 3 depicts a block diagram of components of computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

As depicted, the computer 300 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

One or more programs may be stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to computer 300. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method for assigning access to a quorum disk in a split-storage cluster environment, comprising:

recording, over a time interval, a first storage system input/output (I/O) usage, and a second storage system I/O usage;

determining that a communication link between the first storage system and the second storage system is not operative;

determining that the first storage system I/O usage, over the time interval, was greater than the second storage system I/O usage;

assigning a higher priority to the first storage system;

on condition that the first storage system attempts to access a quorum disk before the second storage system, accessing and locking the quorum disk by the first storage system;

on condition that the second storage system attempts to access the quorum disk before the first storage system attempts to access the quorum disk:
  starting a timer,
  on condition that the first storage system accesses the quorum disk before the timer reaches a predetermined threshold, locking the quorum disk by the first storage system, and
  on condition that the first storage system does not access the quorum disk before the timer reaches the predetermined threshold, granting access to the quorum disk to the second storage system and locking the quorum disk by the second storage system;

wherein accessing and locking the quorum disk means:
  gaining exclusive access to the quorum disk,
  reading cluster information from the quorum disk, and
  forming a cluster in accordance with the cluster information stored on the quorum disk;

wherein the term "not operative" means the communication link is operating at a performance level that is less than a minimum threshold performance level;

wherein the term "performance level" indicates at least one of the following:
  a rate of data transfer, where a greater rate of data transfer is a higher performance level,
  a latency, where a shorter latency is a higher performance level, and
  a rejection rate, where a lower rate of rejected service requests is a higher performance level.

* * * * *